Feb. 9, 1943.  W. H. SILVER  2,310,602
LISTER
Filed Dec. 6, 1937  3 Sheets-Sheet 1
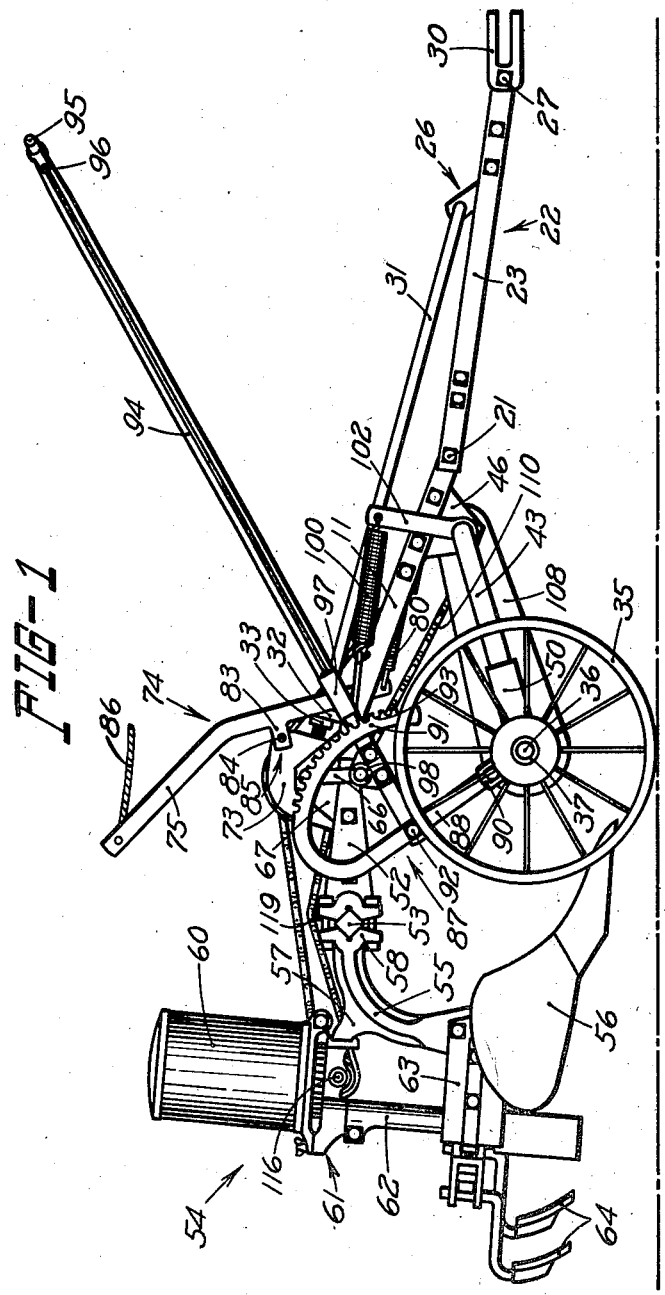
INVENTOR
Walter H. Silver
BY
ATTORNEYS

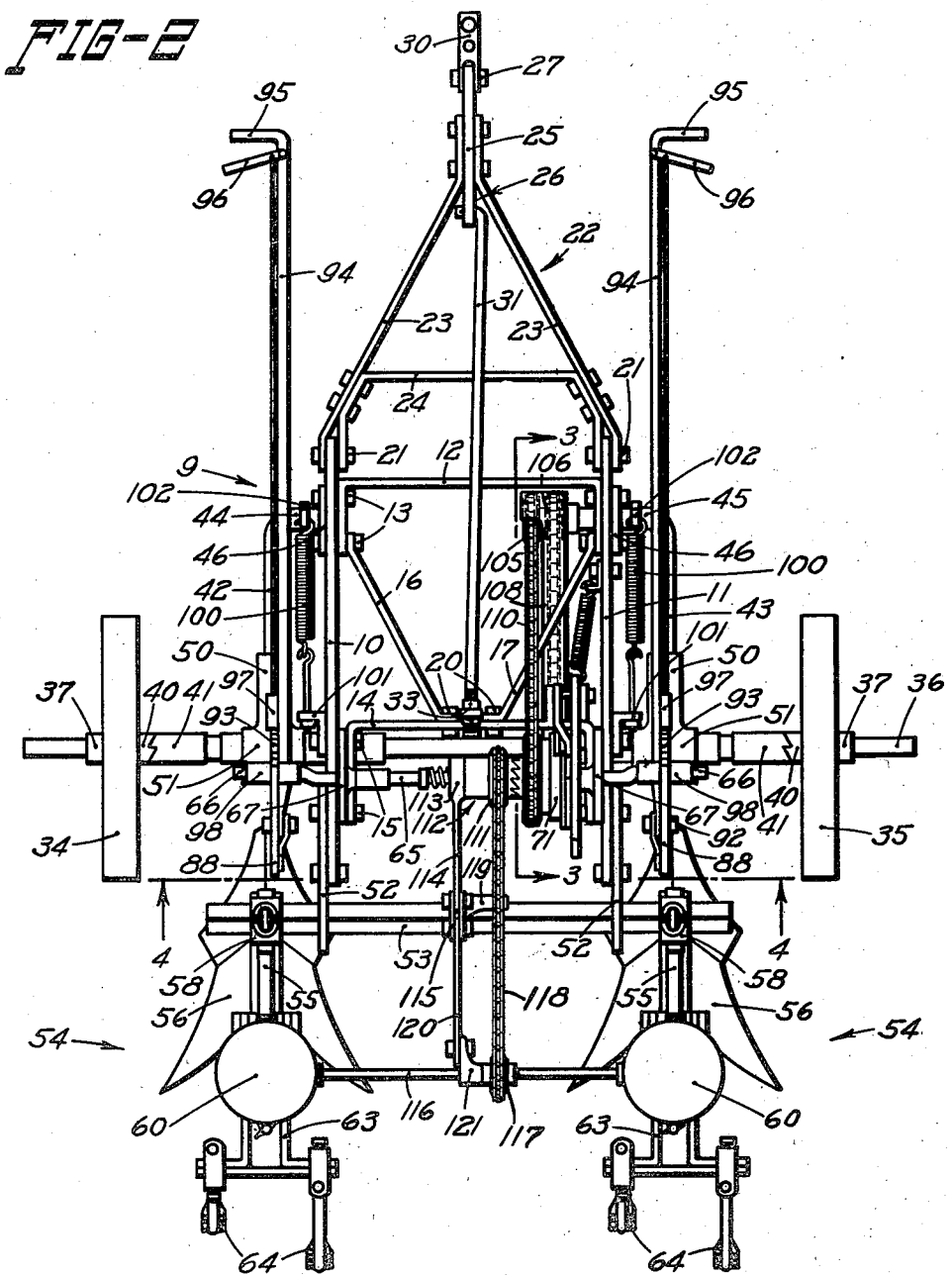

Feb. 9, 1943.  W. H. SILVER  2,310,602
LISTER
Filed Dec. 6, 1937  3 Sheets-Sheet 3
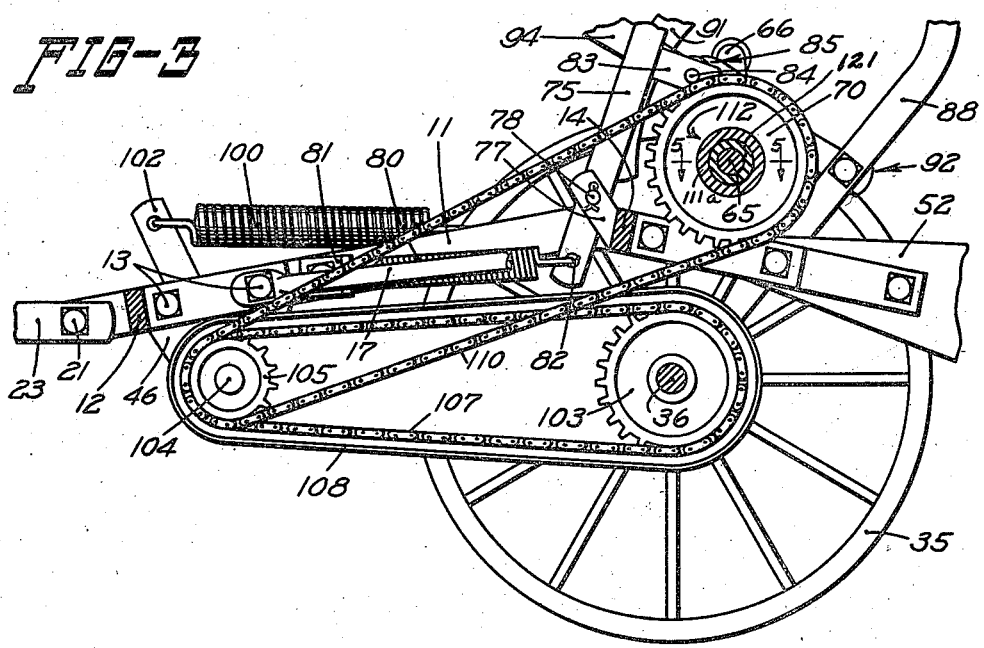
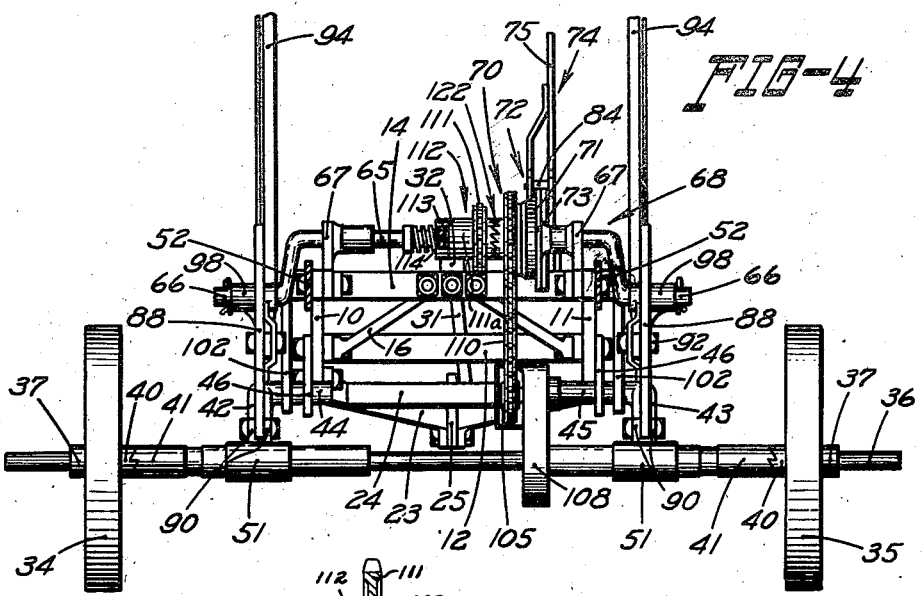
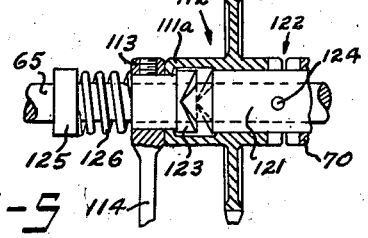
INVENTOR.
Walter H. Silver
BY
ATTORNEYS

UNITED STATES PATENT OFFICE 2,310,602

LISTER

Walter H. Silver, Moline, Ill., assignor to Deere & Company, Moline, Ill., a corporation of Illinois Application December 6, 1937, Serial No. 178,252

16 Claims. (Cl. 111—68)

The present invention relates generally to ground working implements such as plows or planters, and is more directly concerned with the supporting frame structure and mechanism for raising the ground working tools into transport position.

The chief object of the present invention is to provide a new and improved implement frame adjustably supported on ground wheels and having a unitary traction operated lifting mechanism and self interrupting clutch mounted on the frame and operatively connected with the wheels to raise the frame relative thereto.

Another object is to provide an implement embodying a live axle having the ground wheels normally fixed at opposite ends thereof, in which power for actuating the lifting mechanism and other operative mechanism is derived from the axle.

Another object is to provide an implement having lifting mechanism actuated by a traction operated clutch and planting mechanism adapted to be driven from a normally continuously rotating element of the clutch.

These and other objects and advantages will become apparent after a consideration of the following detailed description of an embodiment of my invention, reference being had to the appended drawings, in which—

Figure 1 is a side elevational view of a two row lister planter embodying the principles of my invention, the implement being in transport position;

Figure 2 is a plan view of the planter shown in Figure 1;

Figure 3 is a sectional detail view taken along the line 3—3 in Figure 2, showing the power transmission mechanism with the implement in ground engaging position;

Figure 4 is a rear view, taken along the line 4—4 in Figure 2, of the planter in transport position; and Figure 5 is a horizontal transverse section showing the seeder clutch mechanism, taken generally along the line 5—5 of Figure 3.

Referring now to the drawings, the frame of the implement, indicated in its entirety by the reference numeral 9, comprises a pair of spaced beams 10, 11 extending forwardly and downwardly and connected near their forward ends by a transverse member 12 to which they are secured by bolts 13. Disposed to the rear of member 12 is a second transverse member 14, the ends of which are bent at a right angle and fixed, as by bolts 15, to the beams 10, 11. A pair of bracing rods 16, 17 diverge forwardly and outwardly from the center of the front side of member 14 to which they are secured by bolts 20, and join with the ends of the transverse member 12 where the latter are bolted to the beams 10, 11.

Pivotally connected to the front ends of beams 10, 11 by means of pivot bolts 21 is a draft frame 22 by which the implement is connected to a tractor or other suitable draft means and which comprises a pair of forwardly converging members 23 braced by a cross member 24. The ends of members 23 and 24 embrace the ends of the beams 10, 11, respectively, and a pivot bolt 21 is passed through aligned holes in the three members. At their forward ends, the converging members 23 are fixed to opposite sides of a draft tongue 25, the rear end of which is bent upwardly, as at 26, and the front end of which is pivotally connected, by means of a horizontally disposed pin 27, to a clevis 30 that is adapted to be connected to the drawbar of the propelling tractor. A tension rod 31 provides vertical rigidity between the frame 9 and the draft frame 22, the front end of the rod being bent to one side at a right angle and passed through an aperture in the upturned end 26 of the draft tongue 25. The rear end of the tension rod 31 is secured to the cross member 14 by means of a short stub 32 which is fixed to the member 14 at its midpoint, and through which the rod 31 is passed. Lock nuts 33 on either side of the stub 32 hold the tension rod securely in place.

Supporting the implement are two laterally spaced ground wheels 34, 35 carried on opposite ends of a transversely disposed axle 36. The hubs 37 of the wheels are journaled on the axle for rotation, and the inner faces of the hubs are provided with clutch elements 40 which are adapted to cooperate with companionate clutch elements 41 fixed on the axle 36 to rotate the latter as the implement is drawn forwardly over the ground. Thus, tractive power is normally delivered to the axle equally by both wheels, while on turns the axle is rotated by the outer wheel for supplying power to the power lift mechanism, while the axle rotates within the hub of the inner wheel due to the slipping of the clutch elements. The frame 9 of the implement is supported on the axle 36 by means of two forwardly extending cranks 42, 43, which are bent inwardly at their front ends, as at 44, 45 and journaled in bearing plates 46 which are fixed to the beams 10, 11, respectively, by means of the bolts 13. The rear ends of the cranks 42, 43 are fitted with socket members 50 which are held against axial movement on the cranks but free to turn thereon. A transversely disposed sleeve member 51 at the end of the socket member 50 embraces the axle 36 and provides a bearing in which the axle is free to rotate. This type of supporting structure is not only adapted to vertical adjustment and movement of the frame 9 relative to the axle 36 but also permits of tilting the axle relative to the frame for the purpose of leveling the implement. The two cranks 42, 43 and associated parts constitute wheel frame means swingably connected with the frame 9 by which the ground engaging tools, described below, are carried. The propelling tractor, mentioned above, to which the clevis 30 is connected, serves as supporting means for the front end of the implement when one frame swings generally vertically relative to the other so as to raise the rear end of the tool carrying frame and the tools associated therewith.

Fixed on the rear end of each of the beams 10, 11 is a rearwardly extending tool bar support bracket 52, the top and bottom edges of which diverge somewhat, giving it a substantially triangular shape. In the broad rear portion of the bracket 52 is formed an aperture of size and shape adapted to receive and hold a transversely disposed tool bar 53, and the latter is passed through the two plates 52 and welded thereto.

Mounted on the tool bar 53 are two laterally spaced lister planters 54, each of which comprises a downwardly bent tool beam 55 fixed to the tool bar 53 by means of a clamp 56, and having a double moldboard bottom 56 fixed at the lower end thereof. The planting mechanism is mounted on a bracket 57 formed on the back side of the tool beam 55, and includes a seed hopper 60, selective seed dropping mechanism 61, and seed spout 62. Carried behind the seed spout 62 on a frame 63 which is attached to the tool beam 55 are two staggered covering shovels 64.

Lifting of the frame and attached planting mechanism relative to the axle 36 is accomplished by means of a lifting device, indicated generally by the reference numeral 68, comprising a transversely disposed lifting shaft 65 having cranks 66 formed on opposite ends thereof, which is journaled in bearing support plates 67 fixed on the beams 10, 11, respectively. Journaled for rotation on the lifting shaft 65 is a sprocket 70, comprising part of the power transmission means to be described shortly, and rigidly fixed to the aforesaid sprocket is the driving element 71 of a clutch 72. The clutch 72 is of the well known self-interrupting, half-revolution type, and comprises a normally continuously rotating driving member 71, a normally stationary driven member 73 fixedly mounted on the lifting shaft 65, a dog (not shown) pivoted on the driven member, for connecting the two members during engagement of the clutch, and control means 74 for actuating the clutch including an upwardly and rearwardly extending bifurcated trip lever 75, which is pivotally connected to a pair of bracket members 77 fixed on the transverse member 14, by means of a pin 78. A tension spring 80 which is connected at one end to a bracket 81 fixed on the beam 11 and at the other end engages a perforation 82 in the lever arm 75 below the pin 78, yieldingly holds the trip lever in operative position. Extending rearwardly from the two legs of the bifurcated trip lever 75 adjacent the clutch mechanism 72 are two lugs 83 in which is journaled a roller 84. Normally, the roller 84 fits into a recess, indicated by the reference numeral 85, formed in the periphery of the driven clutch member 73, holding the clutch dog out of engagement with the clutch element 71. When the lever arm 75 is tripped, as by pulling the trip cord 86, the roller 84 is lifted out of the recess 85 permitting coaction between the clutch elements in a manner well known to those skilled in the art. After the clutch has rotated through one-half revolution, the roller drops into a second recess (not shown) disposed at 180° to recess 85, and the clutch element 73 is disengaged from the driving element 71 and again held stationary by the roller 84. Inasmuch as the driven element 73 is fixed to the lifting shaft 65, it will be seen that the latter is rotated through one-half revolution each time the trip cord 86 is pulled.

The lifting force exerted by the turning of the lifting shaft 65 is applied to the crank arms 42, 53 through the agency of adjustable linkage 87 which connects the crank portions 66 at each end of the lifting shaft with the sleeve members 50 on the ends of the cranks 42, 43, respectively. The linkage 87 is composed of a bar 88, one end of which is pivotally supported between lugs 90 formed on the top of the socket members 50, for swinging movement in the plane of rotation of the cranks 42, 43. The bar 88 extends upwardly and rearwardly and curves forwardly at the top thereof to form an arcuate portion 91 of constant radius from the pivot point 92 of a hand lever 94, on the straight portion of the bar. The outer edge of the arcuate portion 91 is provided with notches 93. The hand lever 94 extends forwardly and upwardly to within reach of an operator riding on the platform of the tractor. The forward end of the lever is provided with a convenient handle 95, while an adjacent latch lever 96 actuates a detent 97 engaging the notches 93 on the bar 88 and locking the lever 94 in position. Intermediate the pivot point 92 and the detent 97 is a journal block 98 which is fixed to the lever 94 and is rotatably supported in the lifting shaft crank arm 66. Thus it will be seen that the linkage 87 provides a rigid connection between the crank portions of the lifting shaft 65 and the axle supporting cranks 42, 43 enabling the lifting mechanism to raise the frame by bearing down against the crank ends. At the same time vertical adjustment can be made of either of the ground wheels 34, 35, independently by means of the hand levers 94 for leveling the implement.

The lifting effort required to raise the weight of the frame, which is considerable, is substantially reduced by counter balancing tension springs 100 which are connected at their rear ends to brackets 101 fixed on the beams 10, 11, respectively, and at their front ends engage lever arms 102 which are fixed on the journal portions 44, 45 of the cranks 42, 43.

Coming now to the power transmission mechanism whereby power transmitted through traction of the ground wheels 34, 35, is delivered to the lifting and planting mechanisms, the driving member consists of a sprocket 103 (best shown in Figure 3) which is rigidly mounted on the rotating axle 36. Journaled in the end of the transverse portion 45 of the crank 43 is an idler shaft 104 on which are fixed two sprockets 105, 106. A chain 107 operatively connects the driving sprocket 103 with sprocket 106, turning the idler shaft 104 and sprocket 105, while a chain guard 108, supported on crank portion 45 and axle 36, protects the chain against trash or growing vegetation.

As disclosed earlier, there is a sprocket 70 journaled on the lifting shaft 65, and operatively connecting sprocket 105 with sprocket 70 is a chain 110. Thus, rotation of either or both of the ground wheels 34, 35 as the implement moves forwardly, causes the sprocket 70 to rotate at a proportional speed; the speed ratio being determined by the diameters of the respective driving and driven sprockets.

Also journaled on the lifting shaft 65 is a planting mechanism drive sprocket 111 disposed on the opposite side of the sprocket 70 to the clutch mechanism 72. A clutch device 112 actuated by the rotation of the lifting shaft 65 operatively connects the sprocket 111 with the sprocket 70 when the frame and implements are lowered into ground engaging position. Raising the frame by rotating the lifting shaft 65 causes the clutch 112 to disconnect the sprocket 111 from sprocket 70, each of which has clutch teeth 122 (Figure 4), by moving the sprocket 111 to the left away from the sprocket 70, thus disengaging the teeth on the part 111 from the teeth on the part 70, thereby stopping the operation of the planting mechanism. This type of disconnect clutch is well known to those versed in the art, but it is believed to be new to control such a clutch by the lifting rock shaft 65 on which the clutch is mounted. Referring now to Figures 1, 4 and 5, the hub portion of the sprocket 111 is formed as a drum or casing 111a (Figure 5) within which are disposed a pair of cooperative cam elements 121 and 123, the element 121 being keyed to the lifting shaft 65 by a pin 124 or the like, the other element 123 being attached to a collar 113 which embraces the lifting shaft but is held against rotation by means of a lever arm 114. The opposite end of lever arm 114 is fixed, by means of a bracket 115, to the tool bar 53. A collar 125 is fixed to the shaft 65 and a spring 126 is disposed between the collar 125 and the end of the cam element 123, which projects outwardly through the end of the casing section 111a, to yieldingly hold the clutch teeth 122 on the sprockets 70 and 111 in engagement. Rotation of the lifting shaft 65 through 180° causes relative rotation between the two cam elements 121 and 123, causing the co-acting cam surfaces to shift the sprocket 111 and its teeth 122 away from the part 70, against the force of the spring 126, the cam elements 121 and 123 moving into the position shown in Figure 5, which represents the disengaged position of the clutch. To permit this action, the arm 114 is slightly flexible, or it may be connected with some looseness to the bracket 115. Another half revolution of the lifting shaft 65 rotates one cam element relative to the other so as to permit the inclined portions to nest whereupon the spring 126 shifts the sprocket 111 to the right and re-engages the clutch teeth 122.

The seed dropping mechanism 61 of the planters 54 is actuated by a transversely disposed drive shaft 116 which extends between the two planters and is driven by a sprocket 117 and chain 118; the latter being engaged with the driving sprocket 111. Since the sprocket 70 drives the clutch 112, the clutch 112 drives the sprocket 111, the sprocket 111 drives the chain 118, the chain 118 drives the sprocket 117, and the sprocket 117 drives the shaft 116, these parts may be said to be disposed in serial arrangement. A chain tightener 119 is fixed to the bracket 115 and adapted to bear upwardly against the bottom of the lower length of chain, being adjustable to take up slack as the chain wears. Adjacent the sprocket 117 is a bearing 121 which is journaled on the drive shaft 116 and fixed to one end of an arm 120. The opposite end of the arm 120 is held by the bracket 115, its purpose being to resist the pull of the chain 118 which otherwise tends to bend the drive shaft 116 inwardly.

In the operation of the implement, the frame is leveled and adjusted for proper working depth of the tools 56 by moving the hand levers 94 up or down and locking them into position on the notched sectors 91. Once adjusted, it is necessary only to pull the trip rope 86 when the implement is in forward motion to raise or lower the tools between operative and inoperative positions. The traction driven clutch 72 is operatively connected, by the action of the trip lever 75, with the lifting shaft 65 to rotate the latter through one-half revolution, raising or lowering the implement frame. As the planters are raised the seeding mechanism drive is interrupted by the clutch 112, and as the planters are lowered, the drive is resumed.

What I claim as my invention, is:

1. A planter comprising, in combination, a frame, a vertically adjustable traction wheel journaled thereon, a rotatable lifting shaft journaled on said frame and having a crank formed thereon, link means for connecting said crank with said wheel, a clutch comprising a normally continuously rotating driven member actuated by said traction wheel and journaled on said frame, an intermittently rotating element operatively connected with said lifting shaft and adapted to be optionally connected with and automatically disconnected from the continuously rotating member, control means for actuating said clutch, planting mechanism mounted on said frame, transmission means for actuating said planting mechanism including a driving element adapted to be operatively connected with said continuously rotating clutch member, and clutch means responsive to movement of said frame relative to said axle serially connected with said transmission means.

2. A planter comprising, in combination, a frame, vertically adjustable ground wheels at the sides thereof, a rotatable lifting shaft journaled on said frame and having crank arms on opposite ends thereof, link means for connecting said crank arms with said wheels, a clutch comprising a continuously rotating traction driven member journaled on said lifting shaft and an intermittently rotating element fixed on said lifting shaft and adapted to be optionally connected with and automatically disconnected from the continuously rotating member, control means mounted on said frame for actuating said clutch, planting mechanism mounted on said frame, transmission means for actuating said planting mechanism including a driving element journaled on said lifting shaft and adapted to be operatively connected with said continuously rotating clutch member, and clutch means actuated by said lifting shaft interposed between the driving element and continuously rotating clutch member.

3. A planter comprising, in combination, a frame, an axle having ground wheels fixed at opposite ends thereof, means for connecting said axle to said frame for vertical movement relative thereto, a rotatable lifting shaft disposed on said frame parallel to said axle and having crank arms on opposite ends thereof, means for connecting said crank arms with said axle, said means including manually operated devices for varying the normal position of said axle relative to said frame, a clutch comprising a continuously rotating traction driven member journaled on said lifting shaft and an intermittently rotating element fixed on said lifting shaft and adapted to be optionally connected with and automatically disconnected from the continuously rotating member, control means for actuating said clutch, planting mechanism mounted on said frame, transmission means for actuating said planting mechanism including a driving element journaled on said lifting shaft and adapted to be operatively connected with said continuously rotating clutch member, and clutch means actuated by said lifting shaft interposed between the driving element and continuously rotating clutch member.

4. A planter comprising, in combination, a frame, a pair of cranks journaled thereon for vertical swinging movement, an axle extending between and journaled in the free ends of said cranks, ground wheels disposed on opposite ends of said axle and normally fixed thereto, lifting means mounted on said frame and adapted to swing the said cranks to raise or lower the frame relative to the axle, a clutch having two automatically disengaging elements comprising a continuously rotating driving element actuated by the ground wheels and an intermittently acting element operatively connected with said lifting means and driven, at option, by the continuously rotating element, control means for actuating said clutch, planting mechanism mounted on said frame, driving means for actuating said planting mechanism including a driving member adapted to be operatively connected with said continuously rotating clutch element, and clutch means responsive to movement of said frame relative to said axle disposed in serial connection with said driving means.

5. In a planter the combination of a frame, a pair of cranks journaled on the frame for vertical swinging movement, an axle extending between and journaled in the free ends of said cranks, ground wheels disposed on opposite ends of said axle and normally fixed thereto, a rotatable lifting shaft disposed on said frame parallel to said axle and having crank arms on opposite ends thereof, link means connecting said crank arms with said axle, a clutch comprising a continuously rotating element journaled on said frame and an intermittently rotating element operatively connected with said lifting shaft and adapted to be optionally connecetd with and automatically disconnected from the continuously rotating element, control means for actuating said clutch, power transmission means for driving said continuously rotating clutch element from said axle, planting mechanism mounted on said frame, hand operated depth adjusting levers, power transmission means for actuating said planting mechanism including a driving element adapted to be operatively connected with said continuously rotating clutch element, and clutch means responsive to the movement of said frame relative to said axle disposed in serial connection with said planting mechanism power transmission means.

6. In a planter the combination of a frame, a pair of cranks journaled on the frame for vertical swinging movement, an axle extending between and journaled in the free ends of said cranks, ground wheels disposed near opposite ends of said axle, said wheels being normally in fixed relation thereto, a lifting shaft journaled on said frame parallel to said axle and having crank arms on opposite ends thereof, link means connecting said crank arms with said axle, a clutch comprising a continuously rotating traction driven element journaled on said lifting shaft and an intermittently rotating element fixed on said lifting shaft and adapted to be optionally connected with and automatically disconnected from the continuously rotating element, controlling means for starting, stopping, and holding the said intermittently rotating element, planting mechanism mounted on said frame, driving means for actuating said planting mechanism including a driving element journaled on the lifting shaft and adapted to be operatively connected with said continuously rotating clutch element, and clutch means responsive to movement of said frame relative to said axle disposed in serial connection with said driving mechanism.

7. In a planter the combination of a frame, a pair of cranks journaled on the frame for vertical swinging movement, an axle extending between and journaled in the free ends of said cranks, ground wheels fixed on opposite ends of said axle, a rotatable lifting shaft disposed on said frame parallel to said axle and having crank arms on opposite ends thereof, adjustable link means connecting said crank arms with said axle, a clutch comprising a continuously rotating traction driven element journaled on said lifting shaft and an intermittently rotating element fixed on said lifting shaft and adapted to be optionally connected with and automatically disconnected from the continuously rotating element, controlling means supported on the frame for starting, stopping, and holding the said intermittently rotating element, planting mechanism supported on the rear of said frame, driving means for actuating said planting mechanism including a driving element adapted to be operatively connected with said continuously rotating clutch element, and clutch means responsive to movement of said frame relative to said axle interposed between the driving element and continuously rotating clutch element.

8. An implement comprising, in combination, a frame, a transverse axle, a pair of laterally spaced traction wheels fixed to said axle, means for supporting said frame on said axle and wheels for vertical movement relative thereto, lifting means on said frame and connected with said supporting means to raise the frame relative to said wheels, a power lift clutch connected with said axle so as to be driven from either or both of said wheels and comprising a normally continuously rotating member actuated by said transverse axle, a normally stationary driven member adapted to be optionally connected with and automatically disconnected from the continuously rotating member, and operating connections between said clutch driven member and said lifting means to raise said frame when said clutch is actuated, planting mechanism mounted on said frame and including a pair of laterally spaced units, one adjacent each wheel, driving means operatively connected with said continuously rotating clutch member for driving both of said units from either or both of said wheels, and clutch means responsive to the movement of said lifting means and disposed in serial connection with said driving means for interrupting the planter drive when the frame is raised.

9. An implement comprising, in combination, a generally longitudinal frame having draft means at the front end thereof, a furrow forming tool mounted on the rear end of said frame, a transverse axle having ground wheels normally fixed to the opposite ends thereof, cranks journaled on said transverse axle and extending forwardly therefrom, the front ends of said cranks being pivotally connected to said frame for vertical swinging, a self-interrupting power lift clutch disposed on said frame substantially directly above said axle, said power lift clutch comprising a continuously rotating member and an intermittently actuated driven member, means for driving said continuously rotating member from said wheel axle, means including links connecting said clutch driven member with said cranks to swing the latter downwardly when said clutch is actuated and raise the implement to transport position, planting mechanism disposed on said frame to operate in the furrow formed by said tool, and driving connections actuated from said continuously rotating clutch member for operating said planting mechanism.

10. An implement comprising, in combination, a generally longitudinal frame having draft means at the front end thereof, a furrow forming tool mounted on the rear end of said frame, a transverse axle having ground wheels normally fixed to the opposite ends thereof, cranks journaled on said transverse axle and extending forwardly therefrom, the front ends of said cranks being pivotally connected to said frame for vertical swinging, a transverse rock shaft journaled on said frame and having arms disposed above and connected with said cranks, and a power lift clutch mechanism mounted on said rock shaft and comprising a continuously rotatable member operatively connected with said transverse axle and an intermittently actuated member fixed to said transverse rock shaft.

11. A planting implement comprising a frame, supporting means including a crank axle swingably connected with said frame, a ground wheel on the swinging end of said crank axle, power lift mechanism carried on the frame and including a transverse rock shaft and a continuously rotatable part mounted thereon, means for driving said continuously rotatable part from said ground wheel, a pair of laterally spaced seeding units carried by said frame, a transverse shaft for driving said seeding units, a driving connection between the central portion of said seeding shaft and said continuously rotatable part, and longitudinally extending brace means connected with said frame and having a bearing portion receiving said seeding shaft.

12. In an implement, the combination of a frame, a pair of cranks having laterally inwardly directed portions at their inner ends and axle receiving portions at their outer ends, journal means on said frame receiving the inner ends of said cranks, a rotatable axle carried by the outer ends of said cranks, ground wheels fixed to the outer ends of said axle, a rock shaft journaled on said frame substantially directly over said axle and having cranks at its ends, means operatively connecting said last mentioned cranks, respectively, with the axle receiving portions of said first mentioned cranks, and means for driving said rock shaft from said axle, comprising chain and sprocket sections connected, respectively, to said axle and rock shaft and connected together at the laterally inwardly directed end of one of said first mentioned cranks, whereby the transmission of power from said rotatable axle to said rock shaft is unaffected by the position of the frame relative to said axle.

13. The combination set forth in claim 12, further characterized by said chain and sprocket sections including an idler shaft journaled on the laterally inwardly directed end of one of said first mentioned cranks and a pair of sprockets fixed thereto.

14. In an implement, the combination of a frame, a supporting structure connected with said frame for vertical movement relative thereto, a rotatable axle journaled in said supporting structure and having laterally spaced ground wheels normally fixed at opposite ends thereof, lifting means mounted on said frame and adapted to act against said supporting structure to raise said frame relative thereto, traction operated self-interrupting clutch mechanism mounted on said frame and including a normally continuously rotating member and an intermittently rotating member operatively connected with said lifting means, driving means connecting said continuously rotatable member with said rotatable axle so as to derive power from either or both of said wheels fixed to said axle, auxiliary operating mechanism mounted on said frame, transmission means for actuating said auxiliary operating mechanism by power derived from either or both of said wheels and including a driving member, and means connecting said driving member with said continuously rotating member including clutch means responsive to the operation of said lifting means, disposed in serial arrangement between the two members for interrupting the drive to said auxiliary operating mechanism when said frame is raised.

15. In an implement, the combination of a generally longitudinal frame, a pair of cranks pivotally connected to said frame for pivotal movement about a transverse axis and extending rearwardly therefrom, a ground wheel journaled on the rear end of each of said cranks, power lift mechanism mounted on said frame and including a transverse shaft disposed substantially above the axis of each wheel, articulated chain and sprocket means for driving said power lift from at least one of said ground wheels including relatively movable sections pivotally connected together for relative movement about an axis substantially coincident with said transverse axis, and means connecting said power lift with each of said cranks to swing the latter downwardly and forwardly when the power lift is actuated to raise said frame to transport position.

16. In a planter, the combination of a frame, a rockable lifting shaft on said frame, a self-interrupting clutch mounted on said lifting shaft and including a driven part fixed thereto and a continuously rotatable driving part, means driven from said lifting shaft for raising and lowering said frame, planting means connected with said frame and including driving means, throwout clutch means also mounted on said lifting shaft and connected with said continuously rotatable means and said driving means, and means for disengaging said clutch means by the movement of said lifting shaft.

WALTER H. SILVER.